United States Patent [19]

Friberg et al.

[11] 3,872,368

[45] Mar. 18, 1975

[54] MULTIPLEX SIGNAL PROGRAM SERVO-MECHANISM

[75] Inventors: Vincent P. Friberg, Longmeadow, Mass.; John Chesney, Roselle Park, N.J.; Richard B. Phelps, Wilbraham, Mass.

[73] Assignee: General Instrument Corporation, Newark, N.J.

[22] Filed: Sept. 12, 1973

[21] Appl. No.: 396,504

[52] U.S. Cl................. 318/567, 318/562, 318/568, 318/608
[51] Int. Cl. ........................................ G05b 19/100
[58] Field of Search ............ 318/562, 568, 567, 608

[56] References Cited
UNITED STATES PATENTS

| | | | |
|---|---|---|---|
| 2,475,245 | 7/1949 | Leaver et al......................... | 318/568 |
| 3,110,850 | 11/1963 | Young, Jr. ......................... | 318/562 X |
| 3,241,020 | 3/1966 | Milenkovic......................... | 318/568 |
| 3,657,628 | 4/1972 | Chesney......................... | 318/608 X |
| 3,757,187 | 9/1973 | Arai.................................. | 318/562 |
| 3,783,253 | 1/1974 | Anderson......................... | 318/568 X |

*Primary Examiner*—B. Dobeck

[57] ABSTRACT

A servo-mechanism for controlling the movement of a tool or the like has a transmitting stage and a receiving stage coupled by a dual channel medium. The transmitting stage comprises a first section which generates first and second type position determining signals as well as a reference signal and includes means for combining the first and second type position determining signals and the reference signal to form a first transmission signal. The transmitting stage also has a second section for generating one or more command signals and includes means for combining and converting the command signals into a second transmission signal. The medium has a first channel adapted to carry the first transmission signal and a second channel adapted to carry the second transmission signal. The receiving stage has means for segregating the first transmission signal into its component parts and means for moving the tool in accordance therewith. The receiving section also has means responsive to the command signals of the second channel to control the moving means in accordance therewith.

Distortions inherent in systems utilizing separate channels for each of the position determining signals and reference signal due to uneven stretching or twisting of the coupling medium are herein prevented by multiplexing these signals on a single channel. The motions of the tool in several separate directions are thereby precisely coordinated, significantly enhancing the accuracy of the mechanism.

16 Claims, 15 Drawing Figures

MULTIPLEX SIGNAL PROGRAM SERVO-MECHANISM

The present invention relates to servo-mechanisms for controlling the movements of a tool or the like and in particular to a servo-mechanism which is capable of being programmed by a tape or similar recording medium having all of the position determining signals multiplexed onto a single channel to eliminate the effect of uneven distortions in the medium upon the movement of the tool.

Servo-mechanisms of various types are widely used throughout industry to perform a variety of functions. These machines are particularly useful in moving a cutting tool such as a drill, a knife edge used in conjunction with a lathe, a circular saw, etc., through a preprogrammed set of movements. In many cases, the movements of the tool are preprogrammed and recorded on a recording medium such as tape, such that the precise movements can be repeatedly reproduced by replaying the tape. Because of the versatility and reproducibility capabilities of such a system, servo-mechanisms of this type have proven to be highly effective and economical components of production lines.

Normally, such a system comprises a transmitting, recording, or programming stage which is operably connected to the recording medium. An operator performs the desired operations with a programming tool connected to the transmitting stage. The movements which comprise the operation are converted into electrical signals which are in turn recorded on the medium. The medium is then played back into a receiving stage which duplicates the motions of the operator. Of course, more than one receiving stage can be adopted to reproduce the motions simultaneously, if desired. It is also possible to utilize the machine with the receiving stage directly coupled to the transmitting stage such that the servo-mechanism may directly duplicate the motions of the operator but this does not provide for reproducibility at a future time.

Often, the recording medium is standard magnetic recording tape. If it is desired to change the operation of the tool from one set of motions to another, all that need be done is to change the tapes. This greatly enhances the versatility of such a machine, especially on a batch-type production line which is geared for a plurality of different short runs. Before these machines came into existence, such versatility had to be achieved by mechanically changing the operation of the reproducing portion of the machine such as by changing cams, levers, etc. for each different production run. This necessitated having a library of expensive, accurately made mechanical parts and required a great deal of machine downtime which was necessary to mechanically alter the machine. For this reason, and because the type of servo-mechanism described above permits as many receiving stages as necessary to duplicate a single operation simultaneously, servo-mechanisms programmed by recorded tape have proved extremely valuable.

Normally, the transmitting stages of these servo-mechanisms transmit a separate signal for each direction in which the tool is to be controlled. In the past, each of the signals were separately recorded on the recording medium on a separate channel and when the tape was played back the signal on each of the channels was separately processed and the motions represented thereby mechanically reproduced. An example of such a machine is disclosed in our U.S. Pat. No. 3,657,628 issued Apr. 18, 1972 entitled "Programmed Coil Winding Machine." This patent shows a coil winding machine wherein the rotational motions of the coil form and the translational position of the wire guide are each recorded on a different channel of a tape. Although this system has the advantage of simplicity, it has been found that the accuracy of reproduction by such a system is insufficient for operations which require precise control. An investigation into this problem has revealed that the source of inaccuracy stems from uneven distortion of the tape itself, a problem which is inherent in the use of magnetic tape. Tape elongation and twisting can easily cause a one percent error between separate channels on the tape and thus between motions of the tool in different directions. This error is sufficient to make a servo-mechanism of this type useless when precision operations are necessary.

It is, therefore, a prime object of the present invention to provide a programmed servo-mechanism wherein distortions due to changes in the recording medium are eliminated.

It is a second object of the present invention to provide a programmed servo-mechanism in which the position determining signals for each direction of movement are combined onto a single channel on the recording medium and then segregated in the receiving stage such that any distortion in the recording medium effects all of the position determining signals equally.

It is another object of the present invention to devise a programmed servo-mechanism which can be used without alteration or modification for the reproduction of a vast number of different sequences of operations.

It is a further object of the present invention to devise a programmed servo-mechanism which can be shifted virtually instantaneously from the reproduction of one operational sequence to the reproduction of a different operational sequence without having to take the servo-mechanism out of the production line to adapt it to its new task.

In accordance with the present invention, a programmed servo-mechanism for controlling the movement of a tool or the like is provided having a transmitting stage and a receiving stage coupled by a recording medium. A programming element is operably connected to the transmitting stage. The programming element is manipulated by an operator through the sequence of motions desired to be reproduced by a tool connected to the receiving stage. The transmitting stage generates a signal in accordance with the movement of the programming tool in each direction. These position determining signals are then combined within the transmitting stage to form a first transmission signal. The transmitting stage also generates a series of command signals which may be used, for instance, to actuate the rotation of a drill motor or to initiate the movement of a drill press. These command signals are likewise but separately combined within the transmitting stage to form a second transmission signal.

The recording medium has two channels thereon, one of which will record the first transmission signal and the second of which will record the second transmission signal. The recording medium, when in the playback mode, is operably connected to one or more receiving stages of the servo-mechanism. In this way, the programmed operation can be performed once or as many times as desired at the same time depending upon the number of receiving stages utilized. Each receiving stage separates the signals from each of the channels, respectively. The position determining signals of the first channel are used to position a tool or the like in accordance with the programmed sequence. The command signals of the second channel are utilized to actuate the tool in various ways or to control components of the receiving section of the device to perform various functions.

Because all of the position determining signals are multiplexed onto a single channel of the recording medium, any distortion caused by twisting or stretching of the recording medium effects all of the position determining signals in a similar manner such that the accuracy of the movement of the tool is preserved. Although there may be some variance between the command signals on the one hand and the position determining signals on the other, such will not adversely effect the operation of the machine because precise timing between these two groups of signals is not particularly critical.

To the accomplishment of the above, and to such other objects as may hereinafter appear, the present invention relates to a programmable servo-mechanism for controlling the movement of a tool or the like as defined in the appended claims and as described in the specification, taken together with the accompanying drawings in which:

Figure 1:
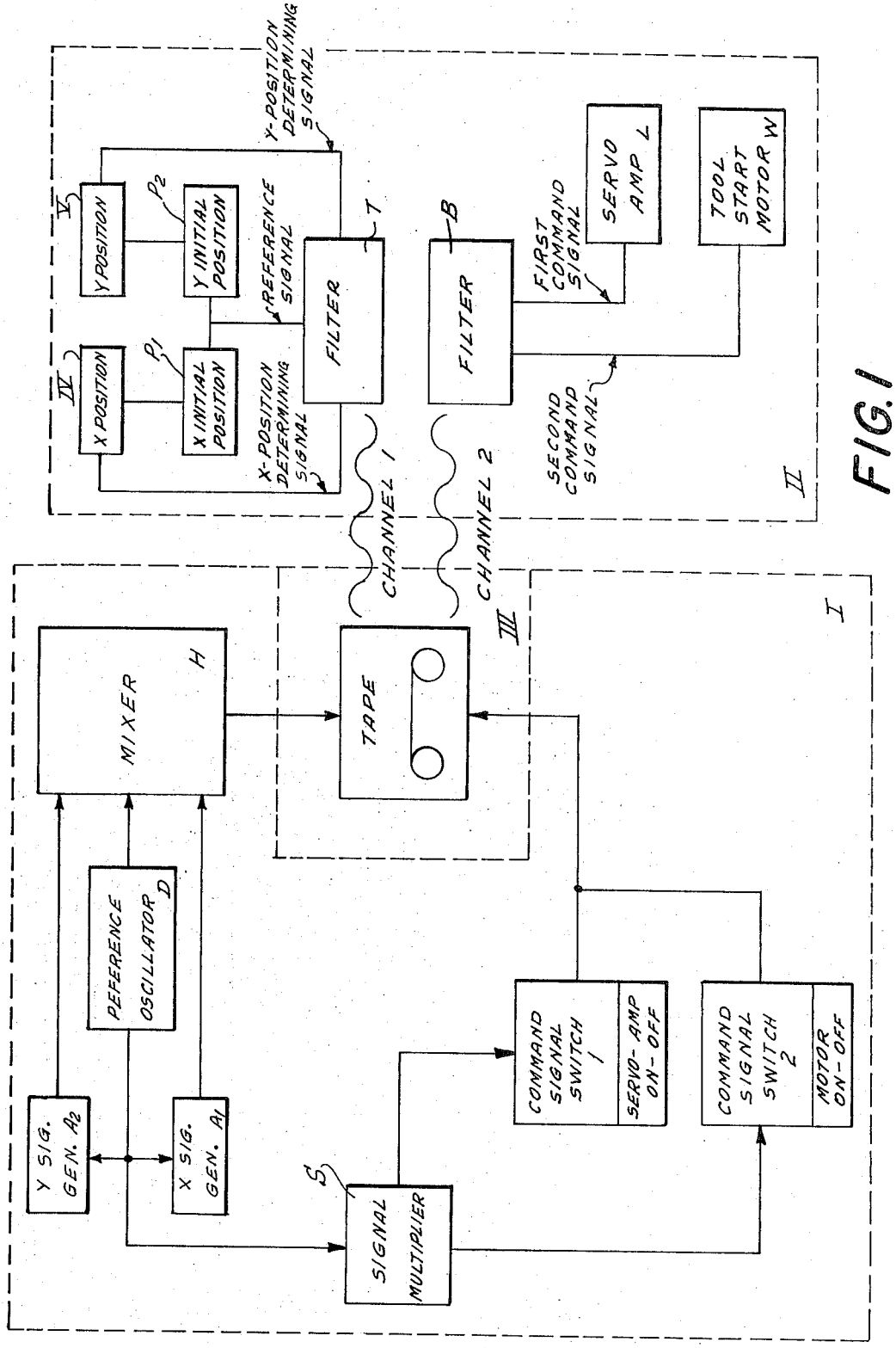
FIG. 1 is a block diagram of a preferred embodiment of the present invention showing the relationship between the transmitting and receiving stages.

In its most basic form, as illustrated in FIG. 1, the servo-mechanism of the present invention consists of a transmitting stage, generally designated I, and a receiving stage, generally designated II, coupled by a dual channel medium, generally designated III. The transmitting stage I has a reference oscillator D, the output of which forms the input for each of the position signal generating means $A_1$, $A_2$. In this description, the servo-mechanism will be described as being capable of controlling a tool in two directions, designated X and Y, respectively. However, it should be understood that the principle herein described could easily be applied for controlling a tool in three directions. A programming element (not shown) is operably connected to both the X signal generator $A_1$ and the Y signal generator $A_2$ such that each of the signal generators respectively generates a signal in accordance with the movement of the program element in that respective direction.

Preferably, the signal generators $A_1$, $A_2$ which take the form of 360° resolvers. These resolvers are mechanical-to-electrical transducers which phase modulate a reference signal in accordance with the position of the programmed tool in the direction to which the generator is sensitive. The outputs of the X signal generator $A_1$ and the Y signal generator $A_2$, respectively and an output from the reference oscillator form the inputs for the mixer H which combines the three signals into a single first transmission signal which is applied to the tape recorder III.

The reference signal also forms the input for a signal multiplier S which takes the reference signal and multiplies it by a given factor a selected number of times equal to the number of command signals which the transmitting section will generate. The command signals will ultimately be used to switch on and off certain portions of the receiving stage such that the tool which is being controlled will function in a prescribed manner.

For example, one of the command signals may be used to switch various components of the receiving stage such as the servo amplifiers L on and off such that the power requirements of the receiving circuit are substantially reduced by not having components operating when they are not being used. A separate command signal may be used, for instance, to activate the motor W to start and stop the rotation of a drill when the drill bit has been positioned in accordance with the positioning determining signals. The signal multiplier S may for example, take the reference signal and multiply it by a factor of two to create a first command signal and multiply the reference signal by a factor of three to create a second command signal. Each of the command signals then goes through the appropriate switching apparatus such that it is either present or absent in accordance with whether or not the particular function controlled by the command signal is desired or not at any particular time in the movement sequence. The command signals are then combined and fed to the tape recorder in order to constitute the second transmission signal.

The recording medium which couples the transmitting stage and the receiving stage of the present invention may be any recording medium desired; however, because of its low cost and relatively good reproducibility characteristics, magnetic tape of the commercially available type has been found to be adequate in this regard. The recording and playback apparatus III utilized in conjunction with the tape must permit the use of two separate channels on the tape, one for the first transmission signal and the second for the second transmission signal.

Although the transmitting stage can be directly coupled to the receiving stage without the use of a tape recorder, it is usually most convenient to use a tape such that the library of tapes corresponding to different operations can be built up and utilized whenever necessary.

Although only a single receiving stage is illustrated in FIG. 1, it should be noted that as many receiving stages as desired can be connected to the tape playback such that they can simultaneously perform the positioning functions.

At the receiving stage the first transmission signal (shown as channel 1 in the drawings) acts as an input to a filter T which separates the first transmission signal into its component parts, i.e., the X position determining signal, the Y position determining signal, and the reference signal. The reference signal is then fed to an X initial position generator $P_1$ and a Y initial position generator $P_2$ which can be manually operated to determine the initial position at which the tool is to be started. The outputs of each of these initial position generators $P_1$, $P_2$ go to the X position determining means, generally designated IV, and Y position determining means, generally designated V, respectively. The X position determining signal is also fed to the X position determining means IV, and likewise the Y position determining signal is also fed to the Y position determining means V. The X and Y position determining means IV and V respectively control the movement of the tool in the X and Y directions.

Another filter B is connected such that the second transmission signal acts as an input thereto. Filter B separates each of the command signals on channel 2 of the tape recorder and relays them to the appropriate mechanism of the receiving stage. For instance, as shown here the first command signal is adapted to turn the servo amplifiers L on and off in accordance with the presence or the absence of the first command signal. The second command signal is utilized, for example, to control a motor W which starts a function of the tool, for instance the rotation of a drill bit. Since the command signals were formed by multiplying the reference signal by a given factor, they comprise frequencies which are far apart enough to make separation relatively easy.

Figure 2:
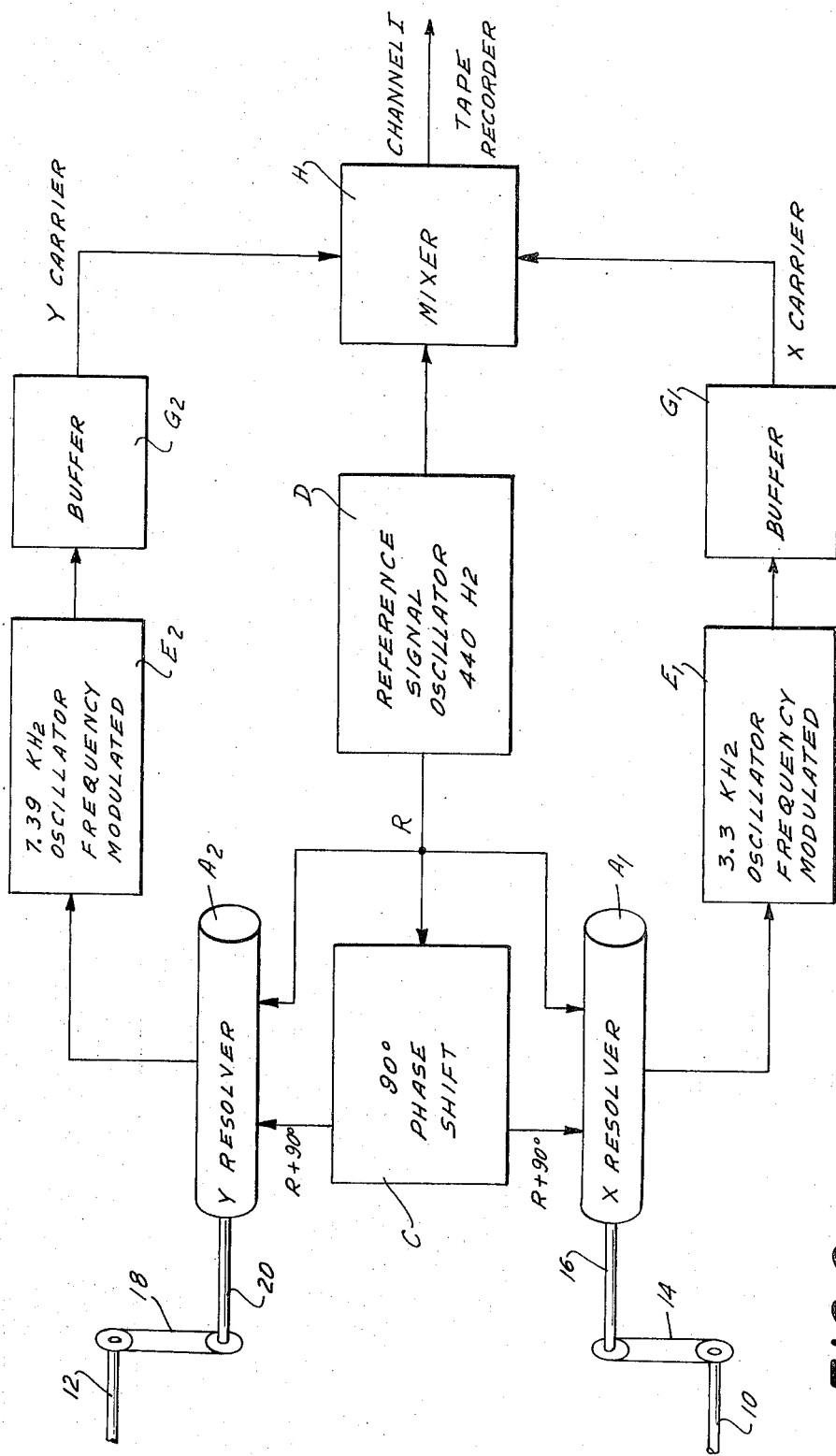
FIG. 2 is a block diagram showing the components of the transmitting section of a preferred embodiment of the present invention.

FIG. 2 shows the transmitting stage in more detail. A programming element (not shown) is operably connected to rotatable shafts 10 and 12 such that the movement of the element in the X direction will rotate shaft 10 and the movement of the element in the Y direction will rotate shaft 12. Shaft 10 is connected by means of a belt 14 to the input shaft 16 of X resolver $A_1$. Shaft 12 is connected, by means of a belt 18 to the input shaft 20 of Y resolver $A_2$.

A resolver is a mechanism which has the characteristic of shifting the phase of an incoming signal by an electrical angle equal to the mechanical angle of the input shaft with respect to a reference position. Each resolver $A_1$, $A_2$, has two inputs, the reference signal (R) and the reference signal phase shifted 90° (R+90°). The output of the resolver is a signal which has a phase shift in accordance with the mechanical position of its input shaft. For instance, if the input shaft is rotated 36° from a reference position, the output of the resolver will be the reference signal with a phase shift which reflects this position, whereas, if the input shaft of the resolver is rotated through another angle, for instance 48°, the output of the resolver will be the reference signal with a greater phase shift reflecting this position. Therefore, each of the resolvers converts the mechanical position of the programming element in a particular direction into an electrical signal whose phase shift is dependent on the position of the element in that direction.

A reference signal oscillator D generates the reference signal R which forms one of the inputs for each of the resolvers $A_1$, $A_2$. In this example, a reference signal having a frequency of 440 Hz is utilized. Although this is not the only frequency which can be used, this frequency has been found to be well suited to this application.

The reference signal R is fed to a 90° phase shifting circuit, generally designated C. The phase shifting circuit C generates an output signal which is the reference signal shifted 90° out of phase. The output of phase shifter $C_1$ (R + 90°) forms the other input for each of the resolvers $A_1$ and $A_2$.

The output for X resolver $A_1$ (which is the reference signal shifted by a phase equal to the X position of the programming element at any particular time) is fed to a frequency modulated oscillator $E_1$. Oscillator $E_1$ converts the phase shifted output of X resolver $A_1$ into an X carrier signal of 3.3 KHz which is frequency modulated in accordance with the phase shift produced by X resolver $A_1$. Likewise, the output of Y resolver $A_2$ is fed to oscillator $E_2$ which generates a frequency modulated Y carrier signal of 7.39 KHz which is frequency modulated in accordance with the phase shift of the output of Y resolver $A_2$. The X and Y carrier signals carry information concerning the position of the programming element in the X and Y directions, respectively at any particular time. Therefore, they carry information concerning the movement of the programming element with respect to its position, its speed and its acceleration because the faster the phase changes occur within a particular time interval, the faster the movement of the tool which is being controlled will change. Further, the rate of change of the phase change in a particular time interval will determine the acceleration at which the tool which is controlled is being moved.

The output of each of the oscillators $E_1$, $E_2$, goes to the buffer circuit $G_1$, $G_2$, respectively associated with each of the oscillators $E_1$, $E_2$. From the buffer circuit $G_1$, $G_2$, the buffeted carrier signals are fed to mixer H, along with the reference signal from oscillator D. In mixer H the signals are combined or multiplexed into a first transmission signal which is fed to channel 1 of the tape recorder III.

Figure 3:
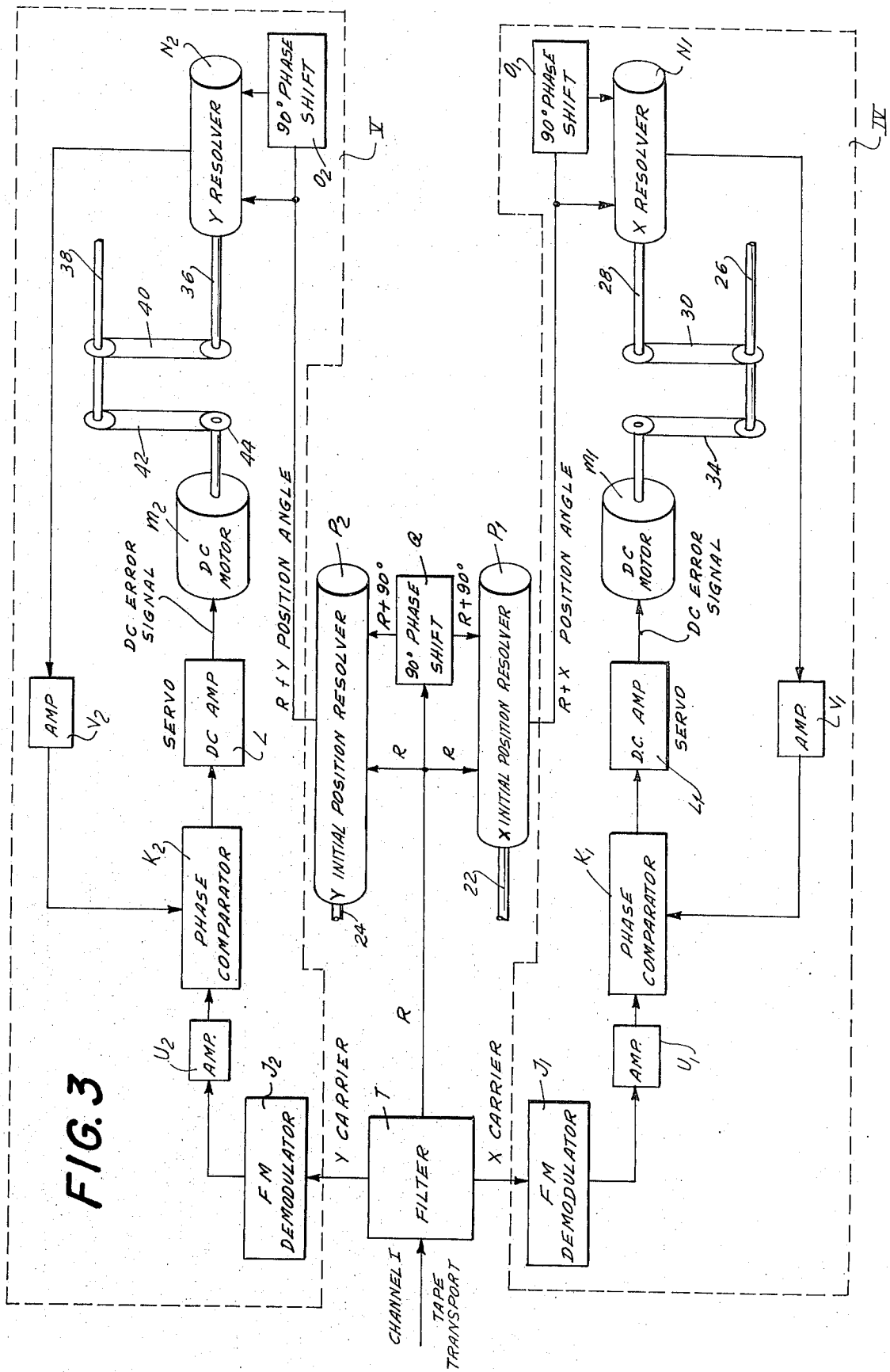
FIG. 3 is a block diagram showing the receiving section of a preferred embodiment of the present invention.

As shown in FIG. 3, which shows the receiving portion of the servo-mechanism of the present invention, channel 1 of the tape recorder constitutes an input for a filter T, which separates the first transmission signal into its component parts. One of the outputs of filter T is the reference signal R which goes to form one of the inputs for each of the initial position resolvers $P_1$ and $P_2$.

Resolver $P_1$ is the X initial position resolver and resolver $P_2$ is the Y initial position resolver. Resolvers $P_1$ and $P_2$ are essentially the same as resolvers $A_1$ and $A_2$ and used in this instance to determine the initial position, in the X and Y directions, respectively, of the tool. A position resolver $P_1$, $P_2$ is necessary for each direction to set the initial position of the tool in that direction. This is because a resolver is controlled through a number of 360° rotational sequences. The phase of the input determines at what angle the output shaft should be with respect to the beginning of the sequence but does not select the appropriate sequence. Therefore, the proper sequence must be selected manually. Resolvers $P_1$, $P_2$ select the initial sequence or position for resolvers $N_1$, $N_2$, respectively. The other input for each of the resolvers $P_1$ and $P_2$ is the reference signal R shifted by 90° which is produced by a 90° phase shifter Q which is similar to phase shifter C. The mechanical input of resolver $P_1$ is rotatable shaft 22. Likewise, resolver $P_2$ has a mechanical input in the form of rotatable shaft 24. The outputs (R + Position Angle) of resolvers $P_1$ and $P_2$ will be the reference signal phase shifted by an amount dependent upon the rotational position of shafts 22, 24, respectively.

Shafts 22, 24 will be manually manipulated by an operator to set the initial position of the controlled tool. The output of resolver $P_1$ (which is the reference signal phase shifted in accordance with the X initial position) forms one of the inputs of the X position determining means IV, the X carrier signal being the other. Likewise, the output from resolver $P_2$ (which is the reference signal phase shifted by an amount equal to the Y initial position) forms one of the inputs for the Y position determining means V, the Y carrier signal being the other.

Filter T also has two other outputs, the X carrier and Y carrier which are fed to the X and Y position determining means IV and V, respectively. The X carrier goes to an FM demodulator $J_1$ which converts the FM modulated signal back into a phase modulated signal. Of course, the phase of the output of demodulator $J_1$ will be dependent upon the frequency of the X carrier, and therefore the output of demodulator $J_1$ will be the X position determining signal. The X position determining signal will be amplified by amplifier $U_1$, the output of which forms one of the inputs of phase comparator $K_1$.

One input of X resolver $N_1$ is R + X position angle, as described above. The other is R + position angle phase shifted 90° by phase shifter $O_1$. X resolver $N_1$ is operably connected to the controlled tool (not shown) by means of shaft 26. Rotatable shaft 26 is operably connected to the input shaft 28 of X resolver $N_1$ by means of belt 30. X resolver $N_1$ is electrically connected to amplifier $V_1$, the output of which forms the other input of the phase comparator $K_1$. The output of amplifier $V_1$ will be phase shifted in accordance with the actual position of the tool to be controlled in the X direction. The output from amplifier $U_1$ (which is the other input for phase comparator $K_1$) in the X position determining signal which is phase shifted in accordance with the position of the programming element in the X direction. Phase comparator $K_1$ compares the phase of the X position determining signal from amplifier $U_1$ (program) and the phase of the signal representative of the actual position in the X direction of the tool and generates a signal of polarity and magnitude in accordance with the direction and amount of difference between these two phase shifted signals. The signal forms the input for a servo amplifier $L_1$ which generates a direct current error signal to DC motor $M_1$. DC motor $M_1$ is operably connected to shaft 26 (which is connected to the tool) to move the tool in the X direction, by means of output shaft 32 and belt 34.

If the phase comparator $K_1$ determines that the actual position in the X direction of the tool is different from the position which is determined by the program, the servo amplifier $L_1$ and motor $M_1$ will rotate shaft 26 to change the position of the tool in the X direction until phase comparator $K_1$ finds no difference in phase between the respective input signals. In this way, the movement of the tool in the X direction is controlled in accordance with the program.

The Y portion of the apparatus works essentially in the same manner. The Y carrier from filter T goes to demodulator $J_2$ which converts the FM carrier into a phase modulated signal. Phase modulated signal is amplified by amplifier $U_2$ and the output of amplifier $U_2$ forms one of the inputs for phase comparator $K_2$. The other input for phase comparator $K_2$ is the output of Y resolver $N_2$ (whose inputs are R + Y position angle and R + Y position angle phase shifter 90° by phase shifter $O_2$) which is operably connected to phase comparator $K_2$ by means of amplifier $V_2$. The signal which comes from amplifier $V_2$ is a signal in which the phase is reflective of the actual Y position of the tool. The signal is generated by Y resolver $N_2$ whose input shaft 36 is operably connected to a rotatable shaft 38 by means of belt 40. Shaft 38 is connected to the tool to rotate in accordance with the movement of the tool in the Y direction.

If phase comparator $K_2$ detects a difference between the phases of the signals coming from amplifier $U_2$ and amplifier $V_2$, it generates a signal to DC servo amplifier $L_2$ which in turn generates a direct current error signal to DC motor $M_2$. DC motor $M_2$ has an output shaft 44 which is operably connected to rotatable shaft 38 by means of belt 42. The rotation of motor 44 will thus move the tool in the Y direction. The error signal will be continuously generated until the actual position of the tool in the Y direction is the same as the position determined by the programmed element.

Of course, phase comparators $K_1$, $K_2$ will generate a signal, the polarity of which will determine the direction in which DC motor will rotate shaft 38. If phase comparator $K_2$ generates a positive signal, for instance, servo amplifier $L_2$ will generate a positive error signal which will cause DC motor $M_2$ to rotate shaft 38 in a clockwise direction, for example. Likewise, if phase comparator $K_2$ generates a negative signal to servo amplifier $L_2$, the DC error signal sent to motor $M_2$ will be negative thus causing motor $M_2$ to rotate shaft 38 in a counter-clockwise direction. In this way, the controlled tool will be brought back to a position in accordance with the position designated by the program.

Figure 4:
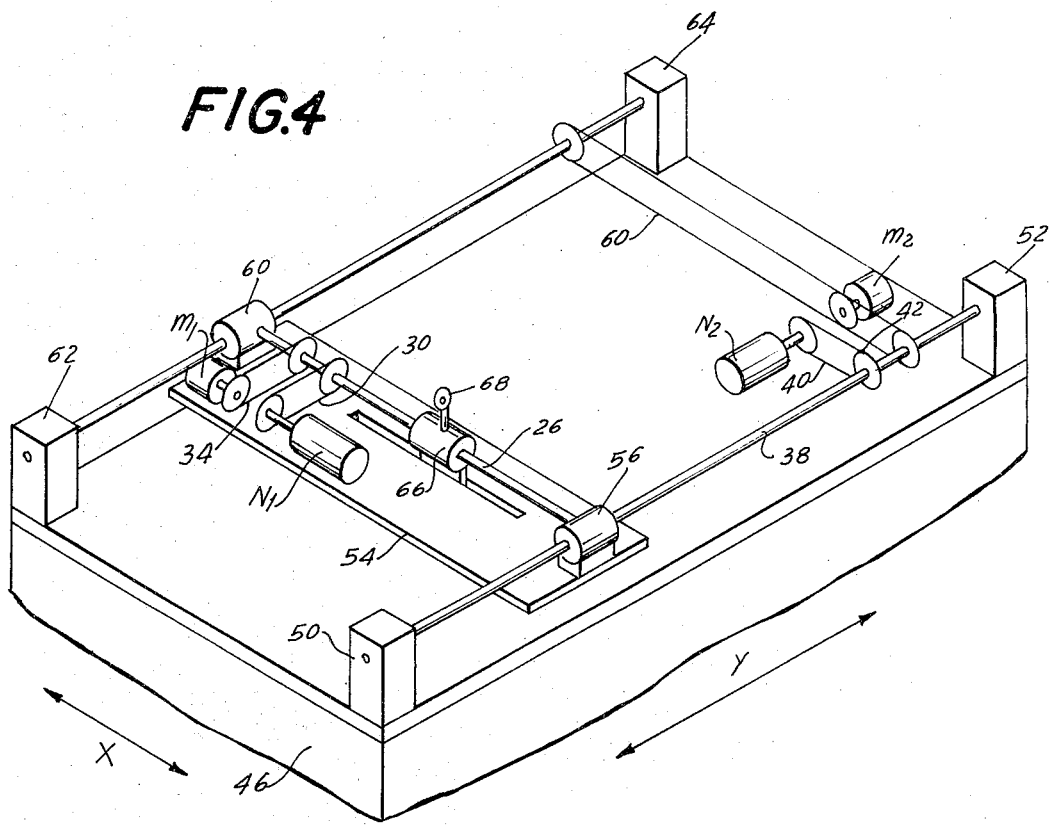
FIG. 4 is an isometric view of one of a tool motion mechanism which could be used in conjunction with the preferred embodiment of the present invention.

FIG. 4 shows one way in which the tool could be set up for the motion in two directions in accordance with a program. The mechanism comprises a table-like support 46 upon which the resolvers $N_1$ and $N_2$ and motors $M_1$ and $M_2$ are mounted. Shaft 38 is journaled in support structures 50 and 52 so as to be freely rotatable. As motor $M_2$ causes shaft 38 to rotate, platform 54 is moved along the Y direction. This is accomplished by externally threading shaft 38 and having the external threads of shaft 38 mesh with an internally threaded collar 56 which is mounted on platform 54. A second shaft 58 also controlled by motor $M_2$ by means of belt 60 causes the other end of platform 54 to move in accordance with the rotation of motor $M_2$. Again, shaft 58 is externally threaded and collar 60 is internally threaded. Shaft 58 is journaled in supports 62 and 64 such that both sides of platform 54 are moved in accordance with the rotation of motor $M_2$.

A shaft 26 is journaled at its ends in collars 56 and 60 respectively and operably connected to motor $M_1$. Shaft 26 is externally threaded, and mounted thereon is a collar 66 which is internally threaded such that it moves in an axial direction as shaft 26 is rotated. Collar 66 has an extended portion 68 which may act as a bit to hold the tool to be controlled. In this way, tool bit 68 is moved in the Y direction in accordance with the rotation of motor $M_2$ and in the X direction in accordance with the rotation of motor $M_1$.

Figure 5:
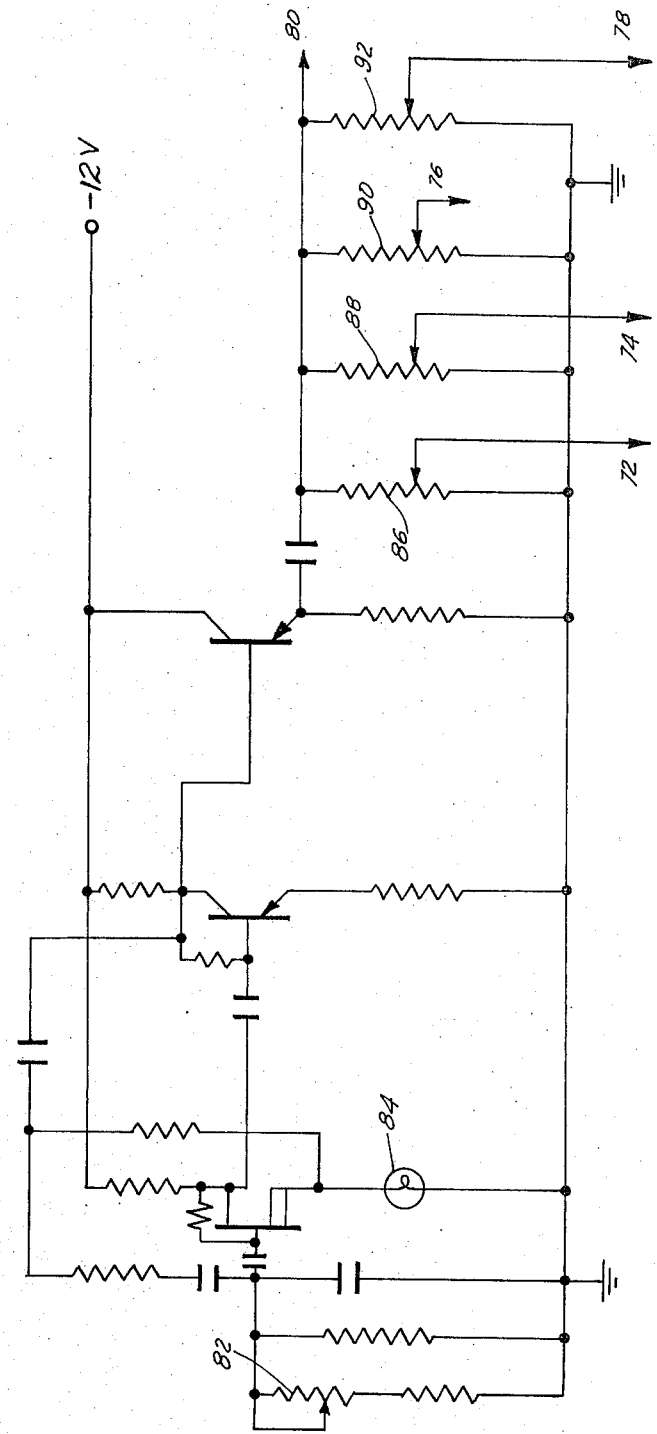
FIG. 5 is a schematic diagram of the oscillator used to produce the reference signal in the preferred embodiment of the present invention.

FIG. 5 shows a schematic diagram of the oscillator D used to generate the reference signal R. Oscillator D has five outputs designated 72, 74, 76, 78 and 80 respectively. The oscillator generates a reference signal R of approximately 440 Hz to each of the outputs. The frequency of the output signals can be adjusted by variable resistor 82. A pilot light 84 serves as a variable linear resistor to keep output signal constant and of sinusoidal wave shape.

The level of each of the outputs 72 through 80 can be adjusted by variable resistors associated with each of the outputs. For instance, output 72, which forms the input to X resolver $A_1$, can be adjusted by means of variable resistor 86. Output 74, which forms the input to Y resolver $A_2$, can be adjusted by means of variable resistor 88. Output 76, which forms the input to the signal multiplier S, and described in detail below, is regulated by variable resistor 90. Output 78 is an extra output which can be utilized in case the reference signal need be used for an additional purpose and is regulated by variable resistor 92. Output 80 forms the input to multiplex generator H. Each of these outputs supplies the respective components to which they are connected with a reference signal of constant frequency and individually variable magnitudes.

Figure 6:
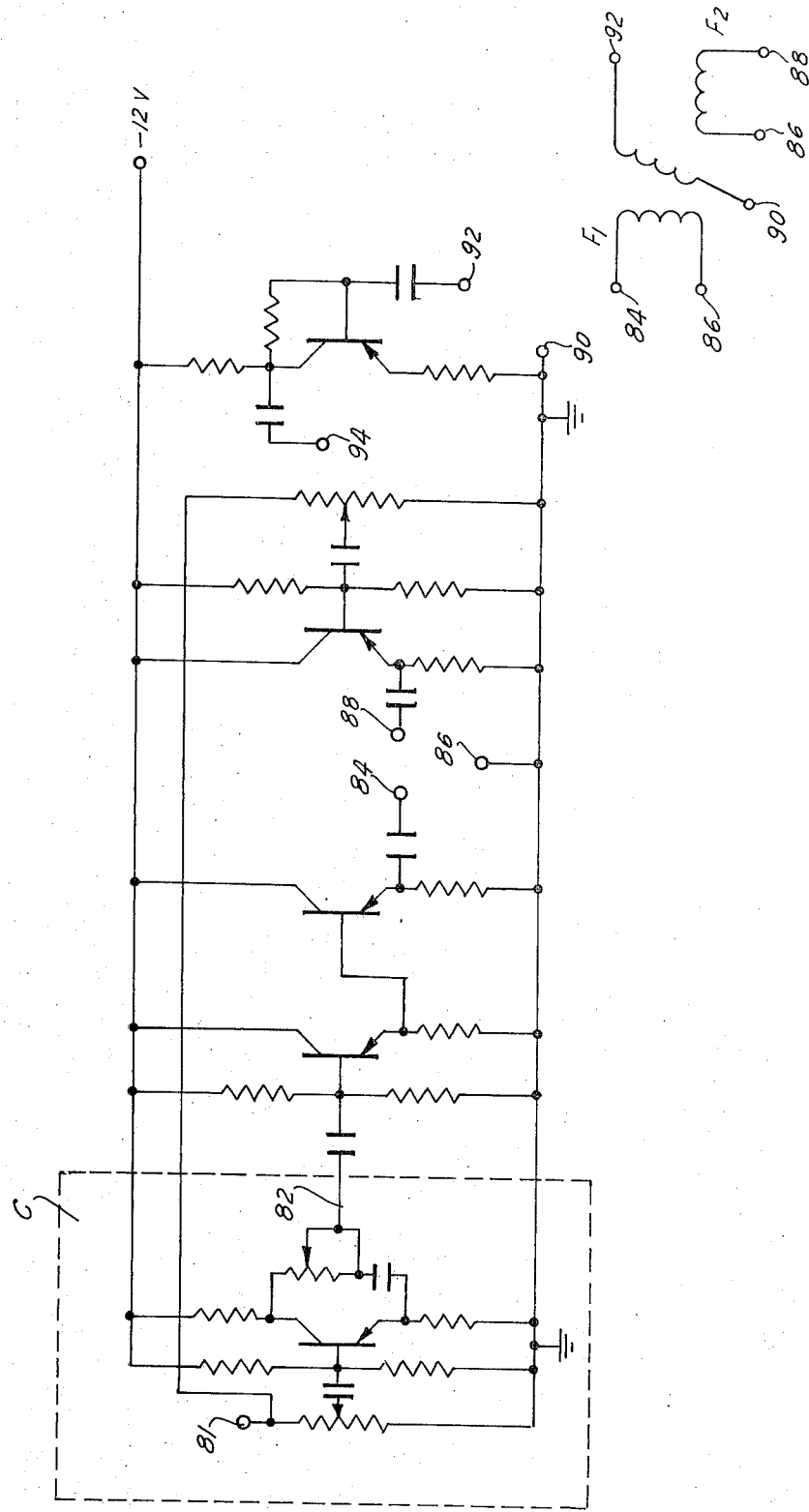
FIG. 6 is a schematic view of a resolver which could be used to generate one of the position determining signals in the preferred form of the present invention.

FIG. 6 illustrates the circuitry associated with resolver $A_1$ or $A_2$. The resolver itself comprises two stators, $F_1$, $F_2$, each of which has two input nodes. In addition, the resolver has a resolver arm with two output nodes 90, 92. The input node 81 of the circuitry shown in FIG. 6 is connected to output 80 of the reference oscillator shown in FIG. 5. The left-hand portion of the circuit labeled C comprises a 90° phase shifting circuit which produces at its output 82 a signal which is the reference signal shifted by 90°. One of the stators $F_1$ of the resolver is connected between node 84 and node 86 of the resolver circuit. This stator $F_1$ is the stator which receives the 90° phase shifted signal. The other stator $F_2$ is connected between nodes 88 and 86; this is the stator that receives the reference signal R. Node 86 is a ground. Node 86 is connected to node 90, also a ground, which connects to one end of the resolver arm 90. The output of the resolver arm is connected to node 92. The output of the resolver circuit shown in FIG. 6 is node 94 which forms the input for one of the frequency modulated oscillators J.

The circuitry shown in FIG. 6 or slight modifications thereof is duplicated in the servo-mechanism, one circuit of which is present for each resolver $A_1$, $A_2$, $P_1$, $P_2$, $N_1$, and $N_2$. The circuitry which forms X resolver $A_1$ has an output 94 which is operably connected to oscillator $E_1$. The circuitry which forms Y resolver $A_2$ has an output 94 which is operably connected to oscillator $E_2$. Outputs 94 are the X and Y position determining signals respectively, comprised of the reference signal R phase shifted in accordance with the position of the program element in the X and Y directions respectively.

For oscillators $E_1$ and $E_2$ respectively, the frequency modulated signals pass through buffer circuitries $G_1$, $G_2$, respectively and are fed to multiplex generator H.

Figure 7:
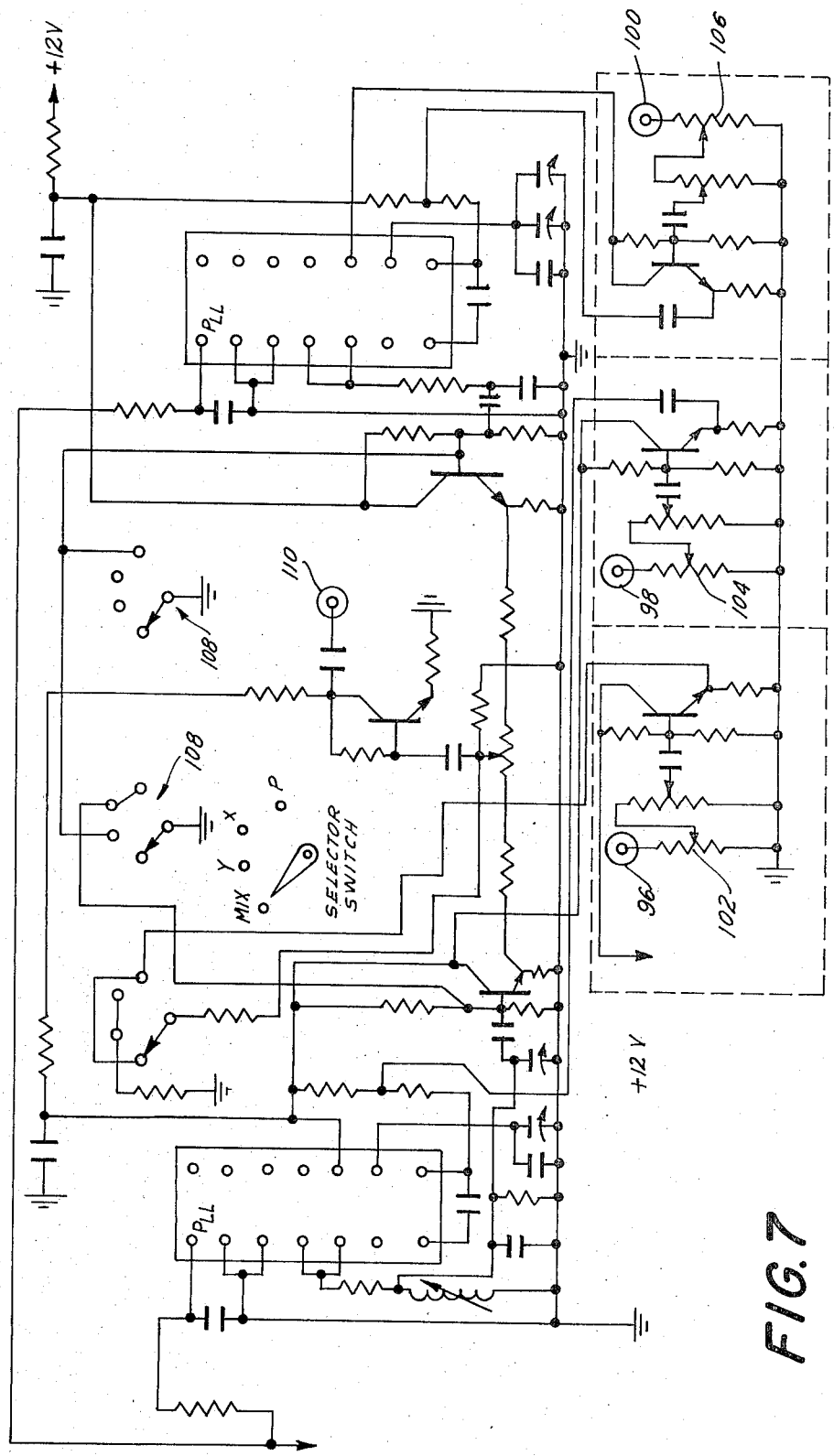
FIG. 7 is a schematic diagram of the multiplex generator of the preferred form of the present invention.

The circuitry associated with mixer or multiplex generator H is shown in FIG. 7. Multiplex generator H has three inputs, node 96 which receives the reference signal R from oscillator D, node 98 which receives the X carrier signal from buffer circuit $G_1$, and node 100 which receives the Y carrier signal from buffer $G_2$. The level of each of these received signals can be adjusted. The level of the reference signal at node 96 can be adjusted by means of variable resistor 102. The level of the X carrier signal received at node 98 can be adjusted by variable resistor 104 and the Y carrier signal received at node 100 can be adjusted by means of variable resistor 106. The multiplex generator has a selector switch 108 by means of which the desired output from the generator can be selected. As shown in the drawing, selector switch 108 can be utilized to have the multiplex generator generate either the reference signal alone, the X carrier signal alone, the Y carrier signal alone or a mixture of the three, the proportions of which are regulated by variable resistors 102, 104 and 106 respectively. The output of multiplex generator H appears at node 110. Node 110 is connected to the input of channel 1 of the tape recorder.

Figure 8:
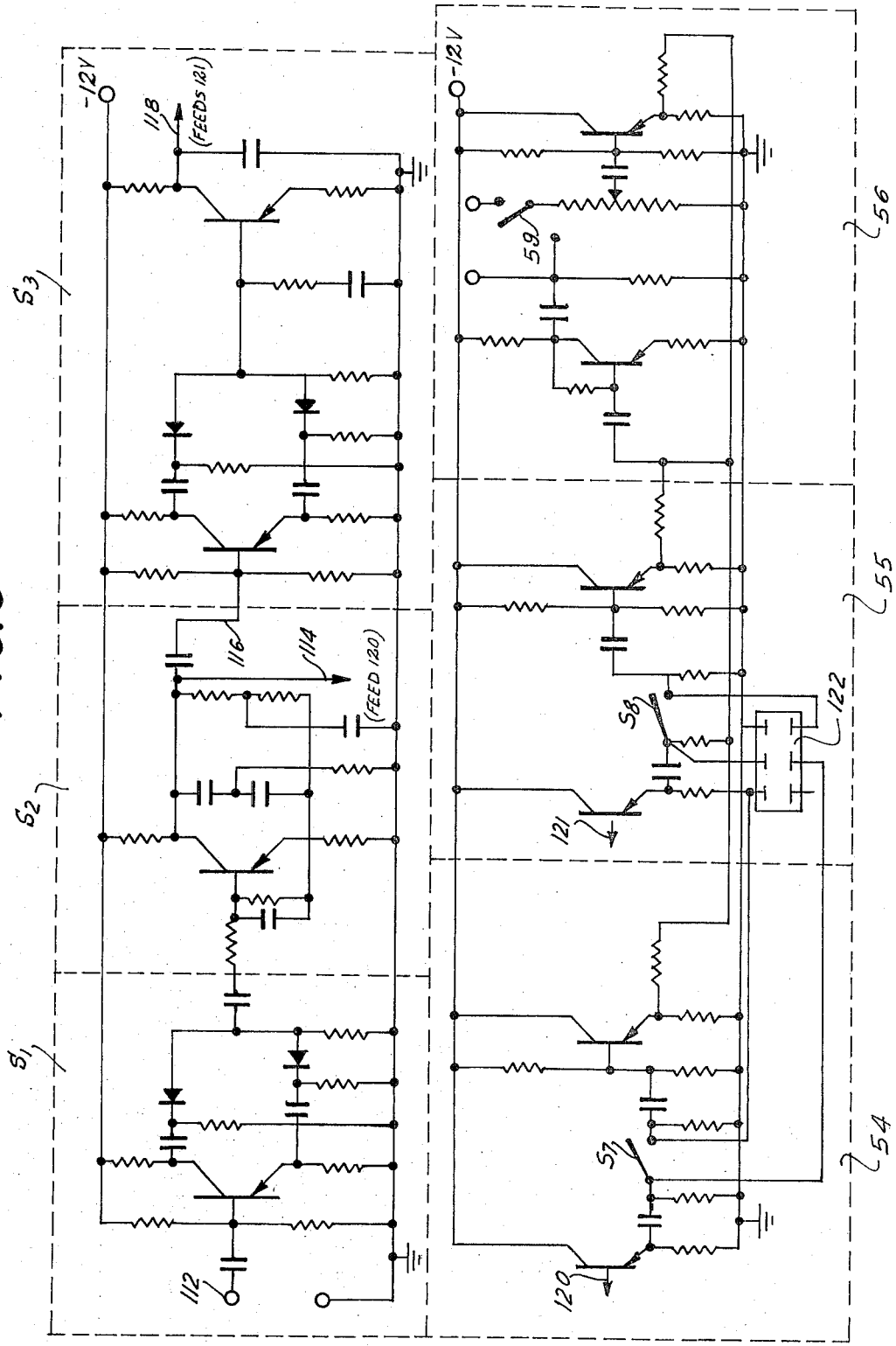
FIG. 8 is a schematic diagram of the circuits employed in generating command signals in the preferred embodiment of the present invention.

FIG. 8 shows the signal multiplier and command signal switch circuits. The upper circuit shown in FIG. 8 is the signal multiplier circuit S. This circuit has an input node 112 which is connected to the output of reference oscillator D. The first section of this circuit, designated $S_1$, acts as a frequency doubler which will change the frequency of the reference signal R from 440 Hz to 880 Hz. The second section of the signal multiplier circuit $S_2$ acts as an 880 Hz bandpass filter and has an output at node 114 of an 880 Hz signal. Filter $S_2$ has another output at node 116 which is connected to the input of the $S_3$ section of this circuit which is another frequency doubler which has an output of 1,760 Hz at node 118. The circuitry shown in the upper portion of FIG. 8 acts to produce two command signals, 880 Hz and 1,760 Hz, respectively which will carry certain information concerning the function of various portions of the receiving stage.

Node 114 carrying the 880 Hz command signal is connected to the input node 120 of the circuitry which is associated with circuit $S_4$. Circuit $S_4$ has a switch $S_7$ which, when closed, will cause the first command signal (880 Hz) to be present on channel 2 of the tape. This signal may be used for various functions, for example, to turn servo amplifiers L on and off in accordance with the program.

The output node 118 is connected to input node 121 which is the input for the circuitry $S_5$ associated with switch $S_8$. This is the second command signal (1,760 Hz) and again can be used to perform various functions, for example, to start a motor to rotate a drill, etc.

The remaining circuitry $S_6$ can be used in conjunction with switch $S_8$ to select whether or not additional command signals are to be utilized. The switch circuits $S_4$, $S_5$ have outputs in jack 122 which is operably connected to the tape recorder to form the input signal of channel 2.

Figure 9:
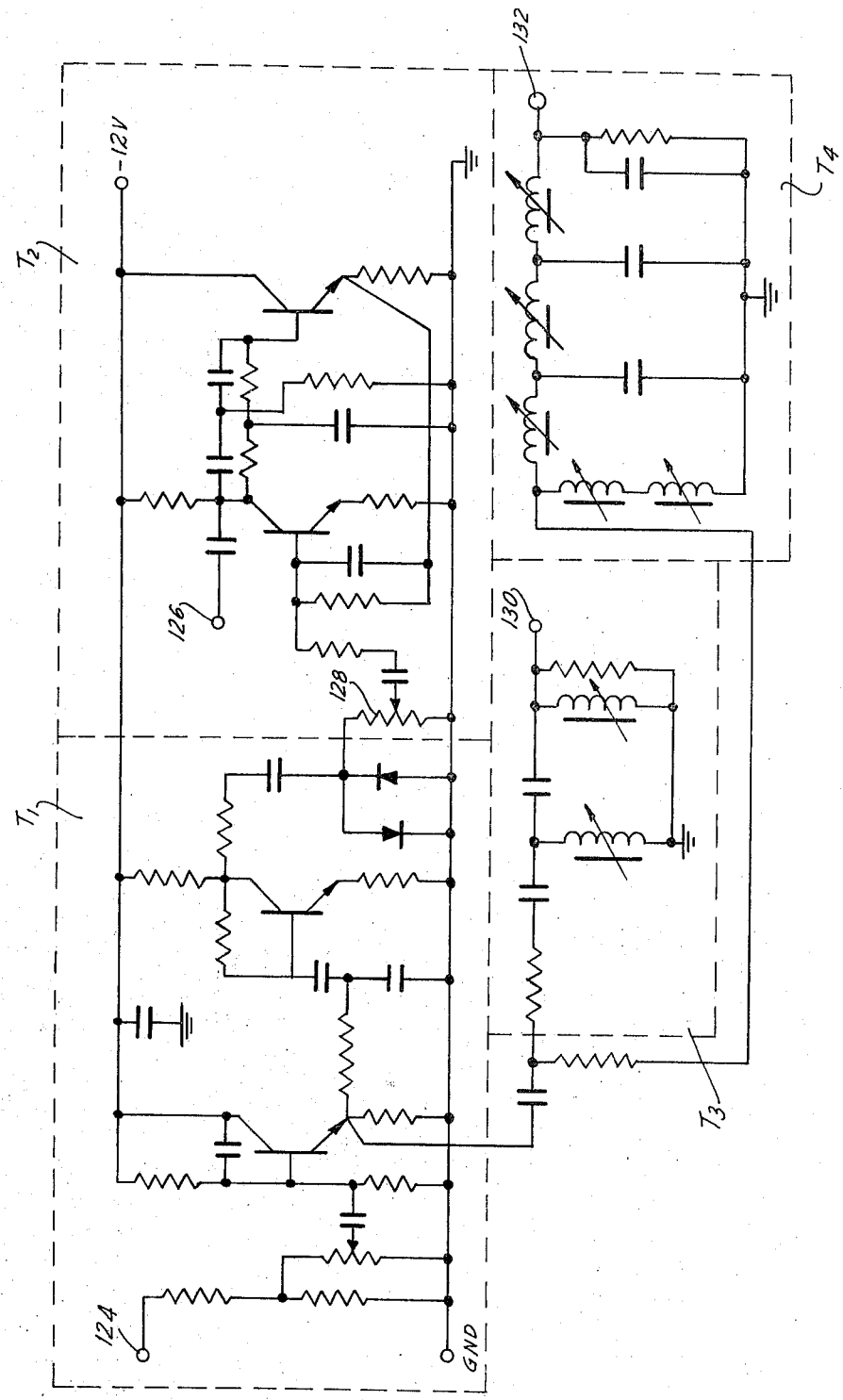
FIG. 9 is a schematic view of the signal segregating means of the preferred form of the present invention.

The circuitry in FIG. 9 shows filter T of the receiving stage. Filter T takes the multiplexed signal from channel 1 of the tape recorder and divides it into its component parts. The input node 124 of filter T is operably connected to the output of channel 1 of the tape recorder. The first section of this circuit designated $T_1$ comprises a signal limiter. The second section of the circuit $T_2$ is a 440 Hz bandpass filter which, at its output node 126, will generate reference signal R. A variable resistor 128 can be utilized to adjust the level of the reference signal R at node 126. The third portion of the circuit designated $T_3$ is a 7.39 KHz filter which has an output node 130 at which the Y carrier signal will appear, and the fourth portion of the circuit, designated $T_4$, has an output node 132 at which the X carrier signal will appear. Nodes 130 and 132, which carry the X carrier signals and the Y carrier signals respectively, are connected to the respective FM demodulator circuits $J_1$ and $J_2$. As mentioned before, the FM demodulator circuits $J_1$, $J_2$ serve to convert the carrier signals which are frequency modulated into the position determining signals which are phase modulated.

The reference signal R output from filter T forms one of the inputs for each initial position resolvers $P_1$, $P_2$, the other input being R shifted 90° by phase shifter Q. These resolvers $P_1$, $P_2$ are essentially the same as shown in FIG. 6. Each resolver $P_1$, $P_2$ generates an output signal (R + Position Angle) which is the reference signal phase shifted in accordance with the initial position in that direction. This output forms one of the inputs for each resolver N, the other input being the signal (R + Position Angle) phase shifted 90° by phase shifter O. Resolvers N are also essentially the same as shown in FIG. 6.

Figure 10:
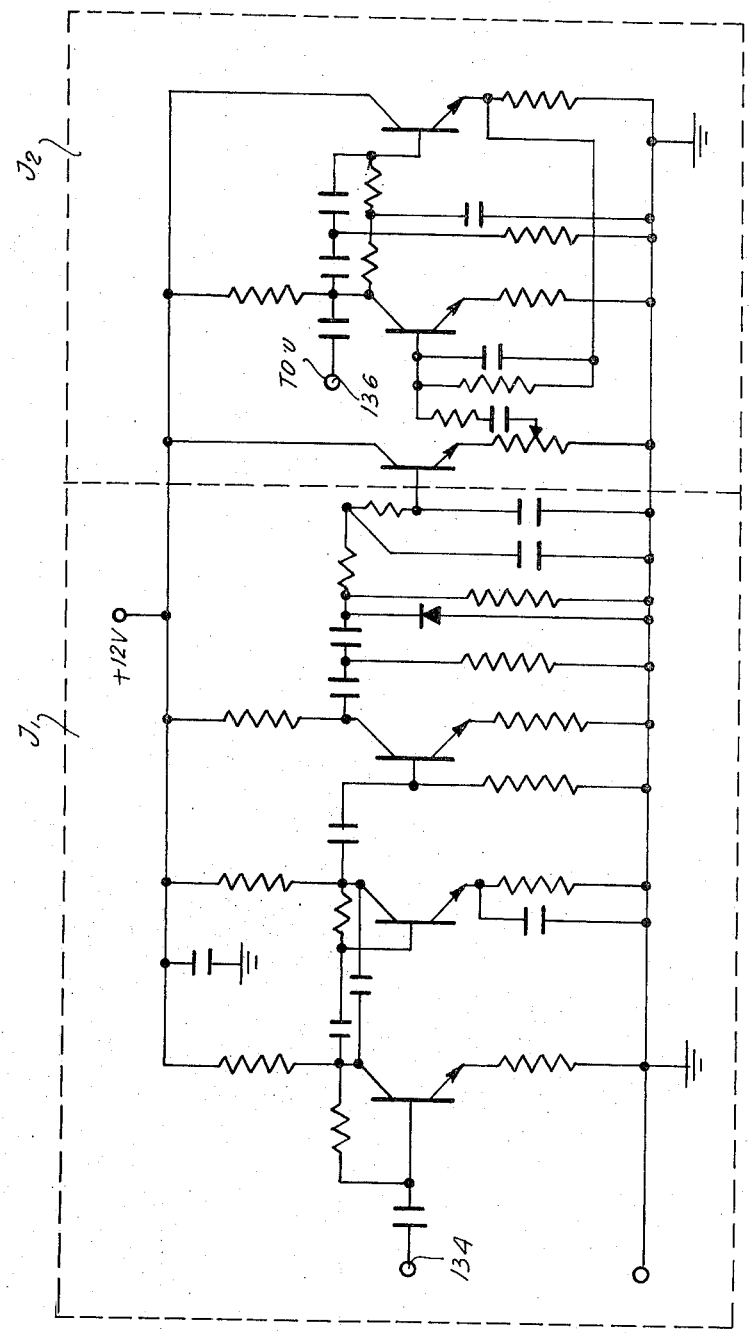
FIG. 10 is a schematic diagram of a signal demodulator utilized in the preferred form of the present invention.

The circuitry associated with one of the demodulators J is shown in FIG. 10. Demodulator J has an input at node 134 which is connected to node 130 or 132 depending upon which demodulator is being shown. The leftmost portion of the circuit acts as an amplifier and signal squarer as well as a pulse-type demodulator. The right-hand portion of the circuit comprises a 440 Hz bandpass filter with an output node 136. Node 136 is connected to form the input of amplifier U.

Figure 11:
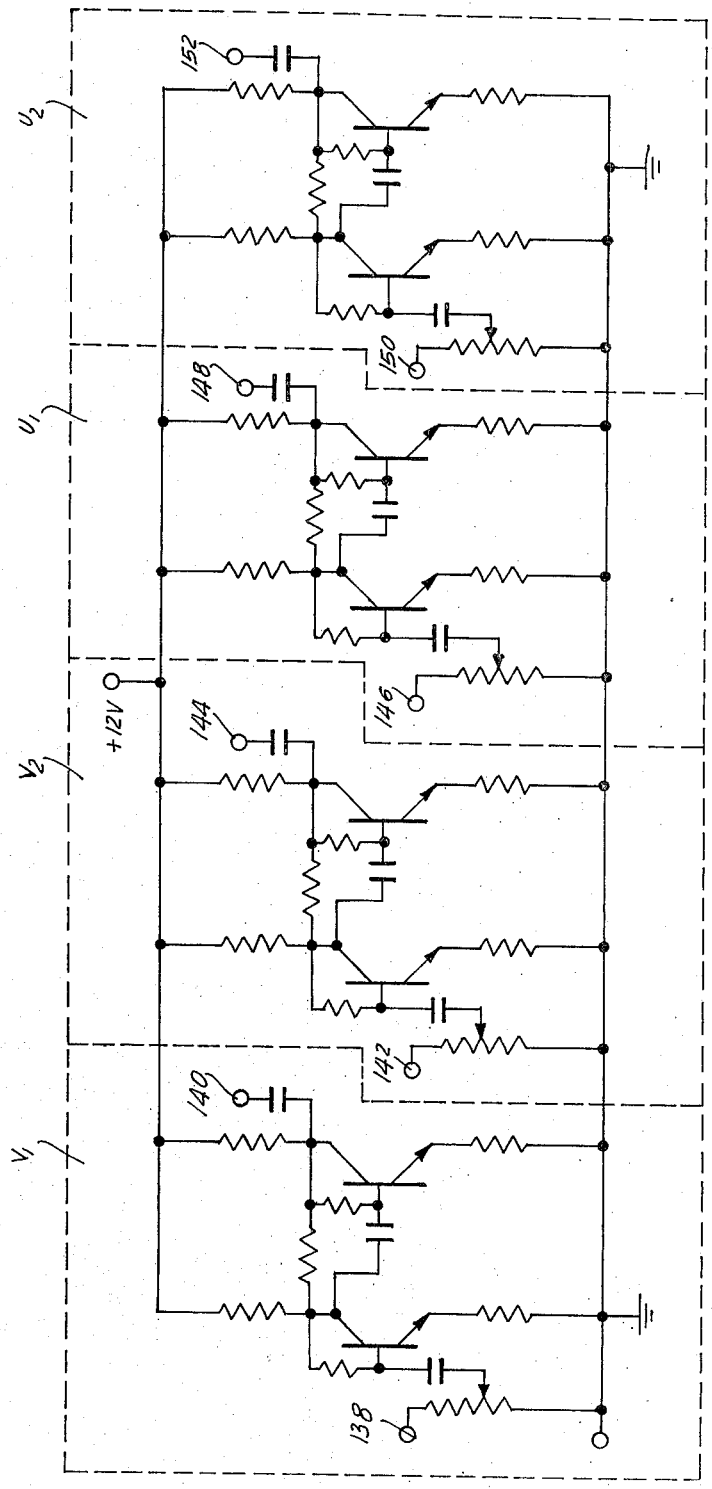
FIG. 11 is a schematic view of four amplifiers utilized in the preferred form of the present invention.

FIG. 11 shows the circuitry associated with amplifiers $V_1$, $V_2$, $U_1$ and $U_2$. The amplifier $V_1$ has an input node 138 which is operably connected to the output of demodulator $J_1$ associated with the X carrier signal. The signal which appears at node 138 will be the X position determining signal. $V_1$ has an output node 140 at which the X determining position signal will appear after it has been amplified by amplifier $V_1$. Node 140 will be operably connected to one of the inputs of phase comparator $K_1$.

Amplifier $V_2$ has an input node 142 which is operably connected to the output of FM demodulator $J_2$ associated with the Y carrier signal. The signal at node 142 will be the Y position determining signal. The output of amplifier $V_2$ at node 144 will be connected to one of the inputs of phase comparator $K_2$.

Amplifier $U_1$ has an input node 146 which receives the output signal from the X resolver $W_1$. The output node 148 of amplifier $U_1$ is connected to the other input of phase comparator $K_1$.

Amplifier $U_2$ has an input node 150 which receives the output signal generated by Y resolver $N_2$. The output node 152 is operably connected to the second input of phase comparator $K_2$. Each of these amplifiers $V_1$, $V_2$, $U_1$, $U_2$ serves to boost the signal level of their respective input signals such that the phase comparators K, to which their outputs are connected, can more accurately determine the phase difference between its respective inputs. Phase comparator $K_1$ will determine the difference in phase between the outputs of amplifier $V_1$ and amplifier $U_1$. Likewise, the phase comparator $K_2$ will determine the difference in phase between the outputs of amplifier $V_2$ and amplifier $U_2$.

Figure 12:
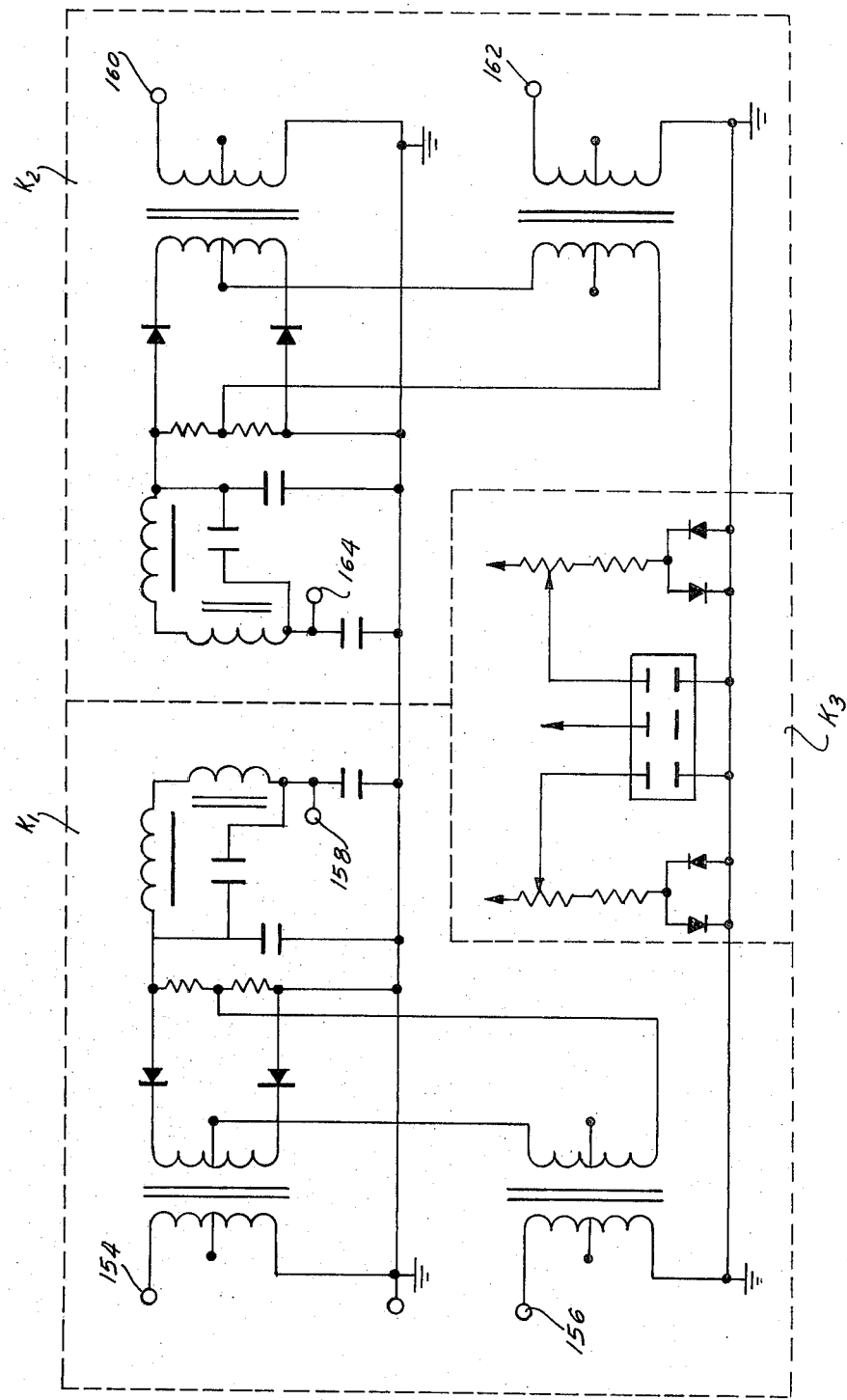
FIG. 12 is a schematic diagram of two phase comparators utilized in the preferred form of the present invention.

The circuitry of phase comparators $K_1$ and $K_2$ is shown in FIG. 12. The left-hand portion of this figure shows the circuitry associated with $K_1$. This circuitry has an input 154 which is operably connected to node 148 of amplifier $U_1$ and an input 156 which is operably connected to node 140 of amplifier $V_1$. This circuitry compares the phase of the signals at nodes 154 and 156 and generates a signal at output node 158 which has a magnitude which is equal to the difference in the phases and a polarity in accordance with the direction thereof. The circuitry of phase comparator $K_2$ works essentially in the same way. Phase comparator $K_2$ has an input 160 which is operably connected to output node 152 of amplifier $U_2$ and an input node 162 which is operably connected to the output node 144 of amplifier $V_2$. This circuitry compares the phase of the signals at node 160 and node 162 and generates an output signal at node 164 which has a magnitude dependent upon the difference in the phases and a polarity in accordance with the direction thereof. The third portion of this circuit $K_3$ permits the operator to adjust the stiffness of the resolvers to obtain a more accurate measurement of the actual position of the tool.

Figure 14:
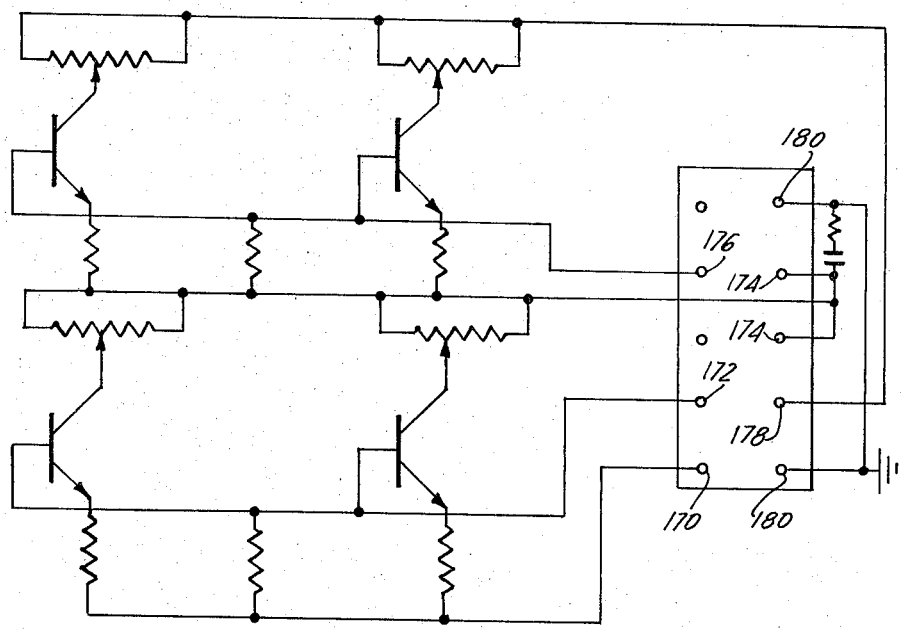
FIG. 14 is a schematic view of the power module used in conjunction with the servo preamplifier in the preferred form of the present invention.
Figure 13:
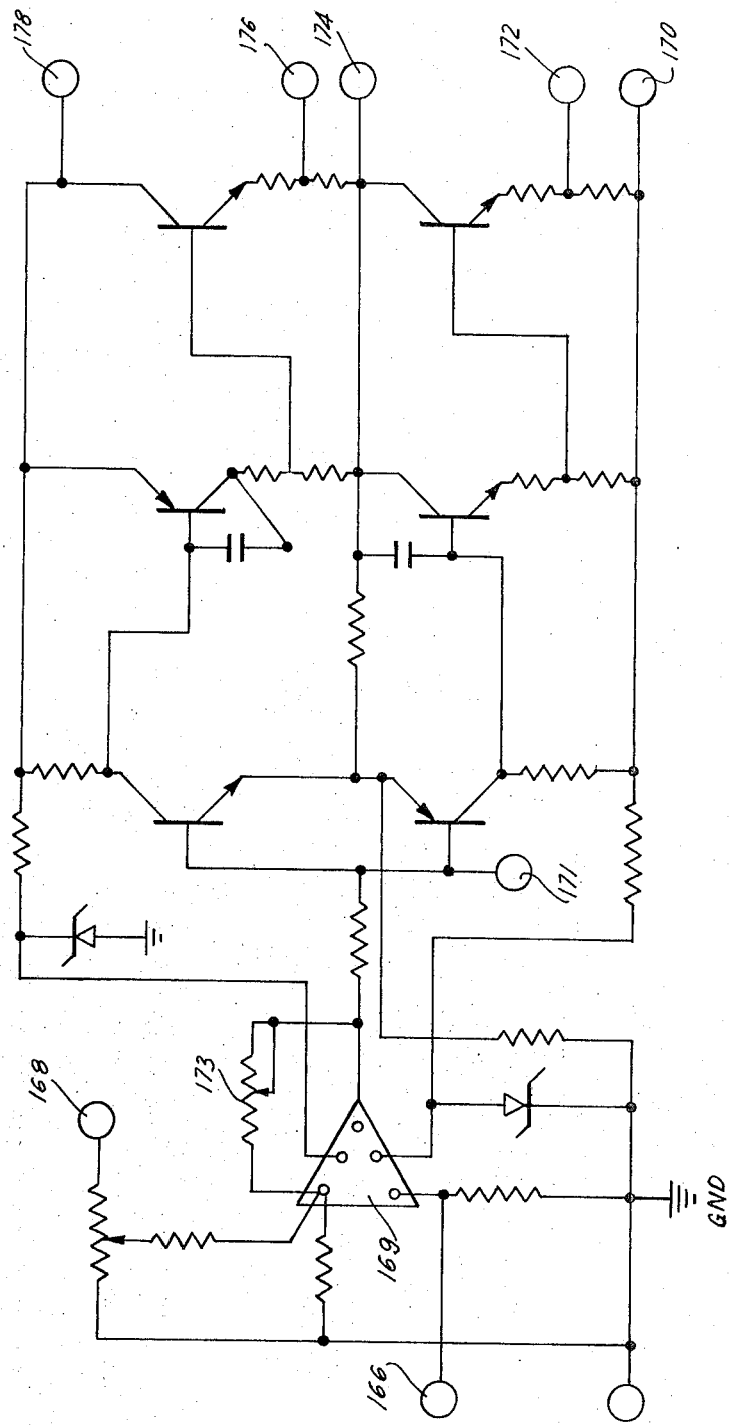
FIG. 13 is a schematic view of the servo preamplifier utilized in the preferred form of the present invention.

Nodes 158 and 164 each form the input for one of the servo-amplifiers $L_1$ or $L_2$. One of these servo amplifiers L is shown in FIG. 14. FIG. 13 shows the servo preamplifier. The circuitry in FIG. 13 has an input node 166 which will be operably connected to either node 164 or node 158 which form the output from one of the phase comparators $K_1$ or $K_2$ respectively. The servo preamplifier shown in FIG. 13, and the servo power module shown in FIG. 14 form a balanced servo amplifier. This means that if no input has occurred at node 166 there will be no output at node 174 which is the output node of the servo amplifier. This is accomplished through the use of operational amplifier 169, operably connected between node 171 and ground. Operational amplifier 169 has an output at node 171 which may be operably connected to ground through the circuitry shown in FIG. 15, to turn the servo amplifier on and off in accordance with the presence or the absence of the appropriate command signal. The gain of this amplifier 169 is controlled by variable resistor 173. Node 168 is connected to the tachometer output of $M_1$ or $M_2$ to stabilize the servo system.

The circuitry of the servo preamplifier shown in FIG. 13 is connected to the servo power amplifier shown in FIG. 14 by means of five nodes 170, 172, 174, 176 and 178. The transistors shown in the circuitry of FIG. 14 are preferably mounted on a heat sink to dissipate the heat generated in operating the servo amplifier. Node 170 is a −32 volt input, node 178 is a +32 volt input, and nodes 174 are connected to the output bus of the power module. Nodes 172 and 176 are internal connections, and node 180 is a ground connection. Since nodes 174 are the output of the servo amplifier, it is at these nodes in which the DC error signal will appear which runs direct current motor $M_1$ or $M_2$ (depending upon which servo amplifier $L_1$ and $L_2$ we are looking at). As explained before, motor $M_1$ or $M_2$ will serve to adjust the position of the tool in accordance with its actual position in that direction and the program position at which it should be situated. No error signal will appear at output node 174 unless the actual position of the tool differs from the program position. In order to achieve this, it is necessary that the servo preamplifier be grounded when there is no input from the phase comparator K. Otherwise, certain unwanted outputs may be present at output node 174, although there is no difference between the actual position of the tool and the program position. This is accomplished by operably connecting node 171 to ground.

Figure 15:
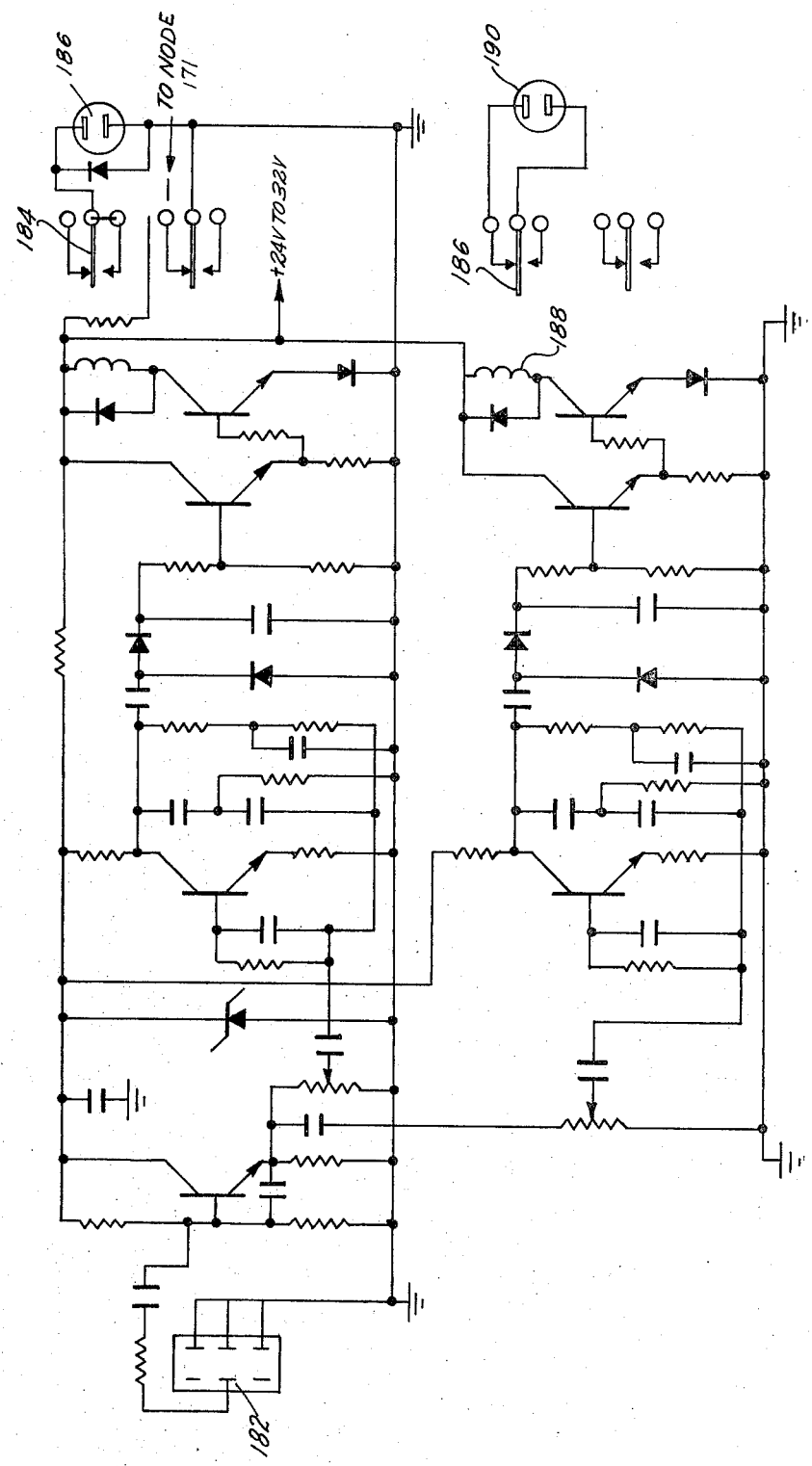
FIG. 15 is a schematic diagram of the circuitry utilized to control certain of the apparatus in conjunction with the command signals in the preferred form of the present invention.

The circuitry as shown in FIG. 15 shows that portion of the receiving stage which operates the servo amplifiers and motors in accordance with the command signals on channel 2 of the tape. The output of channel 2 of the tape forms the input at node 182 of the circuit shown in FIG. 15. The circuit then acts as a filter to divide the various command signals (880 Hz and 1,760 Hz) into separate components, the presence of one of which operates relay 184 to switch on-off the servo amplifier. Relay 184 is operably connected to node 171 of the servo preamplifier shown in FIG. 13 and turns the servo preamplifier off when it is not in use. The remaining portion of this circuit acts to turn off a drill motor having an input node connected to node 190 (not shown), for instance, when not operational. This is done by means of relay 186 which is controlled by coil 188 connected to the circuitry near the bottom of the diagram. Circuitry similar to that shown in FIG. 15 is readily utilizable to activate other similar components at the appropriate times or to perform other similar functions depending upon the intended use of the mechanism.

The above-described circuitry of the present invention has approximately a +50 or −50 Hz deviation tolerance such that frequency deviations within this range will not substantially adversely effect the positioning of the tool. Further, the bandpass filters, i.e., the resistors or capacitors therein, can be adjusted over the range of frequencies in order to obtain the most suitable frequency. Also, the 90° phase shift circuits have been constructed to reduce the frequency dependency of these circuits. All of these enhance the ability of the components of this servo mechanism to function in the appropriate manner.

The circuits disclosed herein are utilized to achieve a particular purpose but they incorporate state-of-the-art designs. Other circuits, or modifications of these circuits disclosed herein are available and could be used to achieve similar results, if desired. The circuitry is shown by way of example to fully disclose one preferred operative embodiment of the present invention.

By multiplexing the X carrier, Y carrier and reference signals onto a single channel of the tape, any distortion of the tape itself, such as stretching, twisting, etc., equally effect each of these signals. In this way, precise accuracy is maintained between the X and Y positions of the tool at any given time no matter how many times the tape is used, under what temperature conditions it is stored and whether minor twisting or uneven stretching has occurred. This is a major advantage over multiple channel systems wherein tape distortions effect each direction of the tool slightly differently.

A single preferred embodiment of the present invention has been specifically disclosed herein for purposes of illustration. It is apparent that many variations and modifications may be made upon the specific apparatus disclosed herein. It is intended to cover all of these variations and modifications which fall within the scope of this invention as defined by the appended claims.

We claim:

1. A servo mechanism for controlling the movement of a tool or the like comprising a transmitting stage and a receiving stage, said transmitting stage and said receiving stage being coupled by a dual channel medium, said transmitting stage comprising first and second sections, said first section comprising means generating position determining signals of a first and a second type and means for combining said first and second type position determining signals to form a first transmission signal, and said second section comprising means generating a command signal and means for converting said command signal into a second transmission signal, said medium having a first channel to carry said first transmission signal and a second channel to carry said second transmission signal, said receiving stage comprising means for segregating said first transmission signal into said first and second type position determining signals and means for moving the tool in accordance therewith, and means responsive to said command signal of said second channel to control said moving means in accordance therewith.

2. The servo mechanism of claim 1 further comprising means for generating a reference signal, said reference signal being combined in said combining means to form a part of said first transmission signal.

3. The servo mechanism of claim 2 wherein said first section comprises a first signal generator for generating said first type position determining signal, a second signal generator for generating said second type position determining signal and a third signal generator for generating said reference signal.

4. The servo-mechanism of claim 3 comprising a programming element operably connected to said first and second signal generators for providing a mechanical input thereto and wherein said first and second signal generators each comprise means for changing the phase of said reference signal in accordance with the movement in a first and second direction respectively of said element and means for converting said respective phase changed reference signals into first and second frequency modulated signals, respectively.

5. The servo-mechanism of claim 3 wherein said combining means comprises means for multiplexing said first and second frequency modulated signals and said reference signal into said first transmission signal.

6. The servo-mechanism of claim 2 wherein said second section comprises means for multiplying said reference signal by a given factor to produce a command signal.

7. The servo-mechanism of claim 2 wherein said second section comprises means for multiplying said reference signal by a first factor to produce a first command signal and by a second factor to produce a second command signal, said first and second factors being different.

8. The servo-mechanism of claim 7 wherein said second sector further comprises means for combining said first and second command signals to form said second transmission signal.

9. The servo-mechanism of claim 1 wherein said receiving stage further comprises first and second position setting means for determining the initial position of the tool.

10. The servo-mechanism of claim 1 wherein said segregating means comprises a series of bandpass filters.

11. The servo-mechanism of claim 4 wherein said receiving stage further comprises first and second demodulators to change said first and second frequency modulated signals respectively back to said first and second type position determining signals respectively, said first and second type position determining signals being phase modulated.

12. The servo-mechanism of claim 2 wherein said tool moving means comprises a resolver operably connected to the tool and having a modified reference signal as a first input and said modified reference signal phase shifted 90° as a second input, a phase comparator having the output from said resolver as a first input and said one of said position determining signals as a second input, said comparator generating an output signal whose magnitude is proportional to the difference in phase between said first and second comparator inputs.

13. The servo-mechanism of claim 12 wherein said moving means further comprises a servo amplifier operably connected to said comparator output to generate an error signal whose magnitude is dependent upon the magnitude of the comparator output.

14. The servo-mechanism of claim 13 wherein said moving means further comprises a motor driven by said error signal and operably connected to the tool.

15. The servo-mechanism of claim 12 wherein said modified reference signal is said reference signal phase shifted by said position setting means.

16. The servo-mechanism of claim 8 wherein command signal responsive means comprises means for segregating each of said command signals and means operably connected to said servo amplifier to turn said servo amplifier on or off in accordance with the presence or absence of one of said command signals.

* * * * *